United States Patent [19]

Hodkinson

[11] 4,220,374
[45] Sep. 2, 1980

[54] METHOD FOR LOCATING ANNULAR SEALS AND ARTICLE PRODUCED THEREBY

[75] Inventor: Harold Hodkinson, Coventry, England

[73] Assignee: Automotive Products Limited, Leamington Spa, England

[21] Appl. No.: 966,641

[22] Filed: Dec. 5, 1978

[30] Foreign Application Priority Data

Dec. 8, 1977 [GB] United Kingdom ............... 51079/77

[51] Int. Cl.² ...................... B60T 13/00; E21B 33/00; F16J 9/00; B23P 11/02
[52] U.S. Cl. .................................... 303/6 C; 29/235; 29/434; 29/451; 277/1
[58] Field of Search .................. 29/156.5 R, 235, 434, 29/451; 188/349; 303/6 C; 277/1, 9.5

[56] References Cited

U.S. PATENT DOCUMENTS

| | | | |
|---|---|---|---|
| 2,807,079 | 9/1957 | Josephson | 29/235 |
| 3,272,542 | 9/1966 | Haulik et al. | 29/451 UX |
| 3,413,024 | 11/1968 | Farquhar | 29/451 UX |
| 3,639,972 | 2/1972 | Schelin et al. | 29/235 X |
| 3,866,299 | 2/1975 | Gregg et al. | 29/235 |
| 3,922,857 | 12/1975 | Carey | 303/6 C X |
| 4,057,296 | 11/1977 | Oka et al. | 303/6 C |
| 4,066,303 | 1/1978 | Ishigami | 303/6 C |

*Primary Examiner*—Charlie T. Moon
*Attorney, Agent, or Firm*—Kemon and Estabrook

[57] ABSTRACT

This invention relates to a method of placing an elastomeric annular piston seal beyond an irregularity in the wall of a bore without damaging the seal and also to apparatus having a piston seal so placed. The seal is fitted onto a smaller diameter portion of the piston than that on which the seal operates so that when the piston is inserted into the bore, the seal moves freely past and is placed beyond the irregularity. When the seal is beyond the irregularity it is moved from the smaller diameter portion onto its operable position by relative movement of the piston past an abutment which is encountered by the seal.

Such a method of assembly is particularly useful for motor vehicle brake master cylinder failure warning switch assemblies.

9 Claims, 1 Drawing Figure

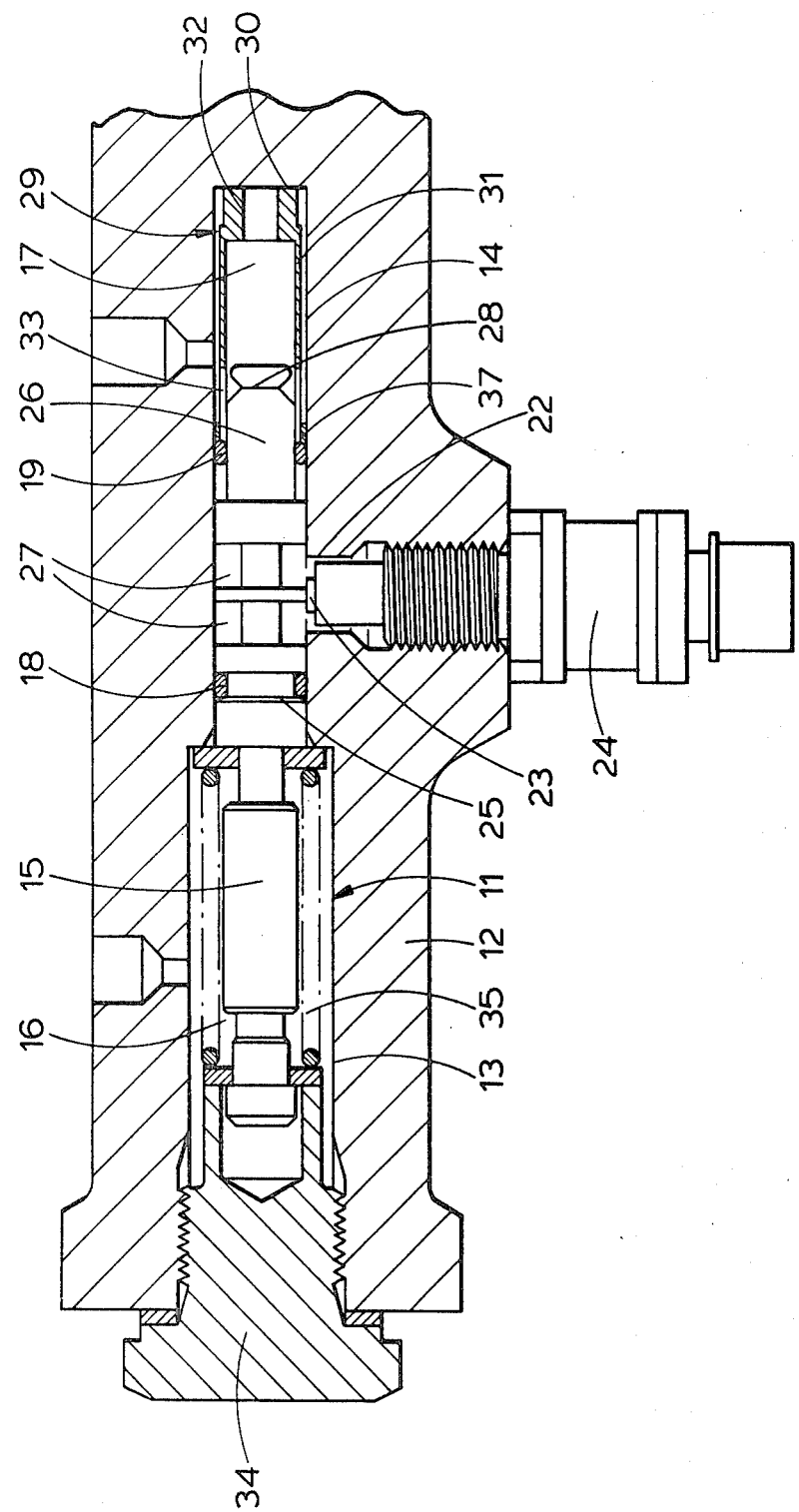

METHOD FOR LOCATING ANNULAR SEALS AND ARTICLE PRODUCED THEREBY

This invention relates to a method of placing an elastomeric annular piston seal beyond an irregularity in the wall of the bore.

During the assembly of some hydraulic components, particularly of pressure failure warning switch assemblies for dual hydraulic circuit tandem master cylinders for vehicle braking systems, an annular piston seal has to be placed into a bore beyond an irregularity, usually an aperture, in the wall of the bore. If the seal is assembled into its operable position on the piston and the piston is then pushed into the bore, the seal may become damaged as it moves past the edges of the aperture.

The object of the present invention is to provide a method of placing such a piston seal in position without damage thereto.

According to this invention there is provided a method of placing an elastomeric annular piston seal beyond an irregularity in the wall of a bore by fitting the seal onto a portion of the piston of smaller diameter than that on which the seal operates, such that on insertion of the piston into the bore the seal moves freely past and is placed beyond the irregularity, and the seal is then moved into its operable position by relative movement of the piston past an abutment by which the seal is encountered.

Preferably the smaller diameter portion of the piston is constituted by a groove which partially accommodates the seal whilst still leaving sufficient protruding above the groove for engagement with the abutment.

Conveniently the abutment may be provided by the rim of an annular release member which can receive the end of the piston having the groove therein such that on relative movement of the piston the rim encounters the seal protruding from its groove and displaces it into its operable position.

According to this invention there is also provided an apparatus to be sealed by a seal placed in position by a method as defined above, conveniently the smaller diameter portion of the piston is a groove and the abutment is a shoulder in the bore.

Alternatively the apparatus may comprise a blind bore and the release member is located in the blind end of the bore and abuts said blind end and receives an adjacent end portion of the piston which has the seal and groove located thereon.

The invention will be described by way of example and with reference to the accompanying drawing which shows a cross-section through a pressure failure warning switch assembly for a dual circuit brake system.

The illustration shows a stepped blind bore 11 within the body 12 of a brake tandem dual circuit master cylinder. The stepped blind bore 11 has a larger diameter portion 13 adjacent the open end of the bore 11 and a smaller diameter portion 14 adjacent the blind end of the bore. A piston 15 is a loose clearance fit in the larger diameter portion 13 and is sealingly reciprocable within the smaller diameter portion 14 of the bore. The piston 15 divides the bore 11 into two chambers, an outer chamber 16 adjacent the open end of the bore, which is closed by an end cap 34, and an inner chamber 17 adjacent the blind end of the bore. The two chambers 16 and 17 are each connected to a respective hydraulic brake circuit.

The two chambers 16 and 17 are sealed from each other by a pair of 'O' ring seals 18 and 19 accommodated in the surface of the piston 15 and sealing against the wall of the smaller diameter portion 14. The seals 18 and 19 are located one each side of an aperture 22 in the wall of the bore. A spring loaded plunger 23 of an electrical contact switch 24 projects through the aperture 22 to contact the piston 15. One seal 18, located between the aperture 22 and the chamber 16, is accommodated in a groove 25 and the other seal 19, located between the aperture 22 and the chamber 17 is accommodated on a smaller diameter co-axial projection 26 of the piston 15 extending towards the blind end of the bore.

The plunger 23 is spring biased against the piston and an annular clearance 27 is provided on each side of the plunger contact point so that if one of the respective hydraulic circuits connected to the chambers 16 and 17 fails, the resultant pressure imbalance in the chambers will move the piston 15 until one of clearances 27 aligns with the plunger 23 which will spring into the clearance making an electrical contact in the switch 24 to operate a failure warning system.

The piston 15 in the chamber 16 carries a caged spring 35, as shown, which acts between abutments fixed by the master cylinder body 12 and the end cap 34 to centralise the piston 15 with respect to the plunger 23.

The invention relates to a method of locating the seal 19 beyond the aperture without damaging it on the edges of the aperture 22. The projection 26 has an annular groove 28 adjacent its innermost end. The base of the groove 28 having a diameter such that when the seal 19 is fitted into groove 28 it will not contact the wall of the smaller diameter portion 14 of the bore 11 but protrudes sufficiently above the surface of the projection 26 to enable it to be pushed out of the groove 28 and onto the projection 26. The groove 28 is a triangular groove providing an inclined surface for rolling the 'O' ring out of the groove.

A release member 29 is located in the blind bore 11 between the piston 15 and the blind end wall 30 of the bore. The release member 29 is cup shaped and has a tubular portion 31 with its rim 37 adjacent the piston 15 and its base 32 abuts the end wall 30. The internal diameter of the tubular portion 31 is such that it can receive the projection 26 whilst the rim 37 of the annular section 31 will abut that part of the seal 19 which protrudes above the surface of the projection 26. There are apertures 33 in the tubular side wall so as to allow free flow of fluid through the member 30. Also the tubular section 31 carries external splines to centre the release member in the bore 14.

The piston 15 has the seals 18 and 19 assembled thereon, the seal 19 being in the groove 28 on the piston 15. The release member 29 is inserted into the bore 11 with its base 32 abutting the end wall 30. The piston 15 is then pushed into bore 11, the seal 19 being clear of the wall of the bore whilst the seal 18 will contact the wall of the bore. The piston 15 is pushed inwards until the seal 19 is beyond the aperture 22 and abutting the rim 37 of the release member 29. Further movement of the piston 15 towards the end wall 30 will cause the seal to be held stationary whilst the piston 15 moves relative thereto into the release member and thus the seal is rolled out of the groove and away from the innermost end of the piston until it takes up its operating position on the projection 26 adjacent the shoulder between said projection 26 and the first portion 20 of the piston 15.

The assembly of the unit is completed by the screwing in of the spring loaded switch unit.

Whilst the positioning of the seal has been described with reference to a piston it is obvious that it can be applied to other situations where there are two co-axial members and it is desired to place a seal between the members, and the seal must be placed past an irregularity in a bore in one of the members.

Thus the term piston in the claims should not be taken to limit the claims to a reciprocable piston but should be extended to cover other sealed members located in a bore.

Whilst the invention has been described utilising a release member 29 to displace the seal 19 it is obvious that a shoulder (not shown) in the wall of the bore could also be utilised for displacement of the seal 19, into its operable position.

I claim:

1. A method of placing an elastomeric annular piston seal beyond an irregularity in the wall of the bore into which the piston is to be inserted and comprising:
    fitting the seal onto a portion of the piston having a smaller diameter than that on which the seal operates;
    inserting the piston into the bore so that the seal moves freely past and is placed beyond the irregularity;
    relatively moving the piston past an abutment by which the seal is encountered so that the seal is moved into its operable position by said relative movement.

2. A method as claimed in claim 1, wherein the smaller diameter portion is constituted by a groove which partially accommodates the seal whilst leaving a sufficient portion protruding above the groove for engagement with the abutment.

3. A method as claimed in claim 2, wherein the abutment is the rim of an annular release member which can receive that end portion of the piston having the groove therein so that on relative movement of the piston, the rim of the release member encounters the seal protruding from its groove and displaces it into its operable position.

4. Apparatus having a piston in a bore to be sealed by a seal, wherein the seal is put in place by a method according to claim 1 or 2.

5. Apparatus having a piston in a bore to be sealed by a seal put in place by a method as claimed in claim 3, wherein the bore is a blind bore and the release member is located in the blind end of the bore and abuts said blind end and receives an adjacent end portion of the piston which has the seal and groove located thereon.

6. Apparatus as claimed in claim 4, wherein the seal is an 'O' ring seal and the abutment rolls the seal from its smaller diameter location up an inclined surface to its operable diameter.

7. Apparatus as claimed in claim 5, wherein the seal is an 'O' ring seal and the abutment rolls the seal from its smaller diameter location up an inclined surface to its operable diameter.

8. A brake master cylinder having apparatus as claimed in claim 4.

9. A brake master cylinder having apparatus as claimed in any one of claims 5 or 7.

* * * * *